(12) United States Patent
Smith (10) Patent No.: US 11,881,888 B2
(45) Date of Patent: Jan. 23, 2024

(54) ELECTRONICS INCLUDING A BIDIRECTIONAL ISOLATION CIRCUIT

(71) Applicant: Micro Motion, Inc., Boulder, CO (US)

(72) Inventor: Brian T. Smith, Johnstown, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 16/977,537

(22) PCT Filed: Mar. 27, 2018

(86) PCT No.: PCT/US2018/024462
§ 371 (c)(1),
(2) Date: Sep. 2, 2020

(87) PCT Pub. No.: WO2019/190471
PCT Pub. Date: Oct. 3, 2019

(65) Prior Publication Data
US 2021/0013921 A1    Jan. 14, 2021

(51) Int. Cl.
*H04B 1/44* (2006.01)
*H04L 12/40* (2006.01)

(52) U.S. Cl.
CPC .............. *H04B 1/44* (2013.01); *H04L 12/40* (2013.01); *H04L 2012/4026* (2013.01)

(58) Field of Classification Search
CPC ... H04B 1/44; H04L 12/40; H04L 2012/4026; G05B 2219/31135
USPC .......................................................... 375/219
See application file for complete search history.

(56) References Cited

U.S. PATENT DOCUMENTS

| 6,232,902 B1* | 5/2001 | Wada | G01F 1/329 |
| | | | 341/143 |
| 2012/0212075 A1* | 8/2012 | Arnet | H02M 1/08 |
| | | | 307/113 |
| 2015/0229235 A1* | 8/2015 | Underhill | H02M 7/797 |
| | | | 363/89 |
| 2016/0087780 A1 | 3/2016 | Goswami et al. | |

FOREIGN PATENT DOCUMENTS

| EP | 1131936 B1 | 9/2001 |
| WO | 0030333 A1 | 5/2000 |
| WO | 0106680 A1 | 1/2001 |
| WO | 03003680 A1 | 1/2003 |
| WO | 2005122423 A2 | 12/2005 |

* cited by examiner

*Primary Examiner* — Fitwi Y Hailegiorgis
(74) *Attorney, Agent, or Firm* — The Ollila Law Group LLC (57) ABSTRACT

An electronics (100, 200) including an electrical isolation is provided. The electronics (100, 200) include a bidirectional isolation circuit (110, 210) separating a first portion (100a, 200a) from a second portion (100, 200b) and a bus transceiver switch (120b, 220b) disposed in the second portion (100b, 200b). The bus transceiver switch (120b, 220b) is communicatively coupled to the bidirectional isolation circuit (110, 210). The bus transceiver switch (120b, 220b) receives from the bidirectional isolation circuit (110, 210) a communication control signal provided by the first portion (100a, 200a).

20 Claims, 5 Drawing Sheets

ELECTRONICS INCLUDING A BIDIRECTIONAL ISOLATION CIRCUIT

TECHNICAL FIELD

The embodiments described below relate to electrical isolation and, more particularly, to an electronics including an electrical isolation.

BACKGROUND

In industrial control products communication must occur in potentially hazardous and electrically noisy environments while utilizing limited computation and/or power resources. Some communication protocols have been developed to operate in such environments. One exemplary communication protocol is the highway addressable remote transducer (HART) protocol. The HART protocol is a method of superimposing communications on a mA-current loop to allow an analog signal and digital communications (the superimposed communication) to be used simultaneously over a single pair of wires. In the HART protocol, this is achieved by using two frequencies to represent logic bits: 1200 Hz (logic 1) and 2200 Hz (logic 0). This method of communication is referred to as frequency shift keying (FSK).

Because of the potentially hazardous and/or electrically noisy environments in which industrial control products are employed, many products include electrical isolation between input/output (I/O) channels, sensor connection, and/or processing functions. In non-hazardous installations, this isolation is provided to eliminate possible ground loop and noise sources since I/O channels may be directed to different systems. In hazardous area installations, the isolation may be necessary to meet approval standards.

Figure 1:
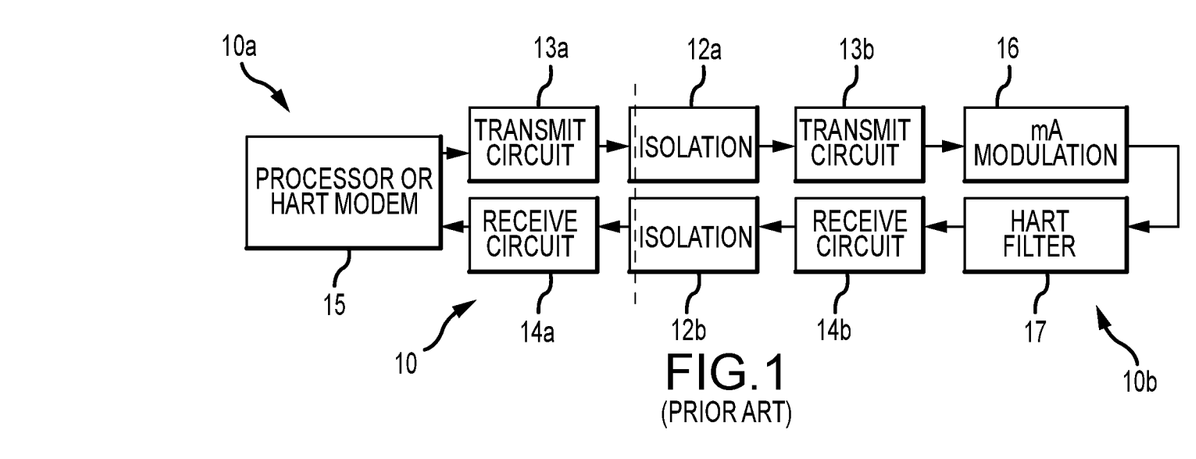
FIG. 1 shows a prior art electronics 10 with electrical isolation.

FIG. 1 shows a prior art electronics 10 with electrical isolation. As shown in FIG. 1, the prior art electronics 10 includes a non-isolated portion 10a and an isolated portion 10b. The non-isolated portion 10a is electrically isolated from the isolated portion 10b by isolation devices 12a, 12b. The non-isolated portion 10a and isolated portion 10b respectively include transmit circuits 13a, 13b and receive circuits 14a, 14b. The non-isolated portion 10a further includes a processor 15 and the isolated portion 10b includes a modulation circuit 16 and a HART filter 17.

The HART transmit frequencies (the frequencies associated with each the '0' or '1' logic) are generated from the processor 15, which may include or be referred to as a HART modem. The frequencies are transmitted across the isolation device 12a, which is typically an optocoupler for digital signals or a linear optocoupler for analog signals. The frequencies are used to modulate the 4-20 mA current setting on the isolated portion 10b. The received HART signals received via the HART filter 17 must also be passed across the isolation device 12b in order to be read and de-modulated by the processor 15. However, there are several issues with this implementation.

First, HART is a half-duplex form of communications. This means that a device transmits or receives a signal but never at the same time. As shown in FIG. 1, when the device transmits a HART signal, the transmitted signal is also seen on the receive circuit. This is called an "echo back" on the transmit signal and is due to there being two separate isolation devices 12a, 12b. This requires two HART isolation points to maintain integrity for transmit and receive.

Second, optocouplers have a wide current transfer ratio (CTR) which limits the design ability to control a tight current draw range. The CTR is a ratio of current provided on one side of the optocoupler relative to a current provided on the other side. This ratio can have a tolerance from 80% to 300%. Since the mA modulation (e.g., HART modulation) is current controlled, it is difficult to control the mA modulation with these high tolerances. Optocouplers also generally require a high drive current which is not desirable for low power or loop powered products.

Third, when a product is powered by an alternating current (AC) voltage yet the outputs must enter a hazardous area, there are many spacing requirements placed on the isolation component. However, the selection of components rated for hazardous area spacing is very limited. In addition, it is desirable to reduce the HART isolation footprint—board real estate (isolation points) and/or power consumption required for the isolation. Accordingly, there is a need for an electronics that includes electrical isolation without the above disadvantages.

SUMMARY

An electronics including an electrical isolation is provided. According to an embodiment, the electronics comprises a bidirectional isolation circuit separating a first portion from a second portion and a bus transceiver switch disposed in the second portion. The bus transceiver switch is communicatively coupled to the bidirectional isolation circuit. The bus transceiver switch receives from the bidirectional isolation circuit a communication control signal provided by the first portion.

A method of electrically isolating a portion of an electronics is provided. According to an embodiment, the method comprises receiving with a bidirectional isolation circuit a communication control signal, wherein the bidirectional isolation circuit separates a first portion and a second portion of the electronics, and the communication control signal is provided by the first portion. The method further comprises providing with the bidirectional isolation circuit the received communication control signal to a bus transceiver switch disposed in the second portion.

Aspects

According to an aspect, an electronics (100, 200) including an electrical isolation comprises a bidirectional isolation circuit (110, 210) separating a first portion (100a, 200a) from a second portion (100b, 200b) and a bus transceiver switch (120b, 220b) disposed in the second portion (100b, 200b). The bus transceiver switch (120b, 220b) is communicatively coupled to the bidirectional isolation circuit (110, 210). The bus transceiver switch (120b, 220b) receives from the bidirectional isolation circuit (110, 210) a communication control signal provided by the first portion (100a, 200a).

Preferably, the bidirectional isolation circuit (110, 210) is comprised of a transformer (112, 212) having a processor terminal (110a, 210a) and a bus terminal (110b, 210b).

Preferably, the bidirectional isolation circuit (210) further comprises a pulse generation circuit (214a) communicatively coupled to the transformer (212), the pulse generation circuit (214a) is configured to receive the communication control signal, generate a pulse signal based on the communication control signal, and provide the pulse signal to the transformer (212). The bidirectional isolation circuit (210) also comprises a pulse decode circuit (214b) communicatively coupled to the transformer (212) and configured to receive the pulse signal from the transformer (212) and decode the received pulse signal into the communication control signal received by the bus transceiver switch (220b).

Preferably, the bidirectional isolation circuit (110) is further comprised of a control isolation circuit (114) configured to receive the communication control signal from the first portion (100a) of the electronics (100) and provide the communication control signal to the bus transceiver switch (120b).

Preferably, the control isolation circuit (114) is comprised of a pulse generation circuit (414a) and configured to receive the communication control signal and generate a pulse signal based on the communication control signal, a transformer (412) communicatively coupled to the pulse generation circuit (414a) and configured to receive the pulse signal from the pulse generation circuit (414a) and provide the pulse signal, and a pulse decode circuit (414b) communicatively coupled to the transformer (412) and configured to receive the pulse signal provided by the transformer (412) and decode the received pulse signal into the communication control signal received by the bus transceiver switch (120b, 220b).

Preferably, the electronics (100, 200) further comprises a processor transceiver switch (120a, 220a) disposed in the first portion (100a, 200a) of the electronics (100, 200), the processor transceiver switch (120a, 220a) is configured to be controlled by the communication control signal.

Preferably, the electronics (100, 200) further comprises a processor transceiver circuit (130a, 230a) having a processor transmit terminal (132at, 232at) and a processor receive terminal (134at, 234at), wherein the processor transceiver switch (120a, 220a) is selectively communicatively coupled with the processor transmit terminal (132at, 232at) and the processor receive terminal (134at, 234at).

Preferably, the processor transceiver circuit (130a, 230a) is comprised of a processor transmit circuit (132a, 232a) and a processor receive circuit (134a, 234a). The processor transmit circuit (132a, 232a) is configured to receive a digital communication from a processor (140, 240) in the first portion (100a, 200a) and transmit the received digital communication to the processor transceiver switch (120a, 220a). The processor receive circuit (134a, 234a) is configured to receive a digital communication from the processor transceiver switch (120a, 220a) and transmit the received digital communication to the processor (140, 240).

Preferably, the electronics (100, 200) further comprises a bus transceiver circuit (130b, 230b) having a bus transmit terminal (132bt, 232bt) and a bus receive terminal (134bt, 234bt), wherein the bus transceiver switch (120b, 220b) is selectively communicatively coupled with the bus transmit terminal (132bt, 232bt) and the bus receive terminal (134bt, 234bt).

Preferably, the bus transceiver circuit (130b, 230b) is comprised of a bus transmit circuit (132b, 232b) and a bus receive circuit (134b, 234b). The bus transmit circuit (132b, 232b) is configured to receive a digital communication from the bus transceiver switch (120b, 220b) and transmit the received digital communication to a bus loop (L1, L2). The bus receive circuit (134b, 234b) is configured to receive a digital communication from the bus loop (L1, L2) and transmit the received digital communication to the bus transceiver switch (120b, 220b).

According to an aspect, a method of electrically isolating a portion of an electronics comprises receiving with a bidirectional isolation circuit a communication control signal, wherein the bidirectional isolation circuit separates a first portion and a second portion of the electronics, and the communication control signal is provided by the first portion. The method further comprises providing with the bidirectional isolation circuit the received communication control signal to a bus transceiver switch disposed in the second portion.

Preferably, the method further comprises providing a transformer in the bidirectional isolation circuit, the transformer having a processor terminal and a second terminal.

Preferably, the method further comprises providing and communicatively coupling a pulse generation circuit to the transformer, wherein the pulse generation circuit receives the communication control signal from the first portion, generates a pulse signal based on the communication control signal, and provides the pulse signal to the transformer. The method further comprises providing and communicatively coupling a pulse decode circuit to the transformer, wherein the pulse decode circuit receives the pulse signal from the transformer and decodes the received pulse signal into the communication control signal received by the bus transceiver switch.

Preferably, the method further comprises providing a control isolation circuit, receiving with the control isolation circuit the communication control signal, and providing with the control isolation circuit the received communication control signal to the bus transceiver switch disposed in the second portion.

Preferably, providing the control isolation circuit comprises providing a pulse generation circuit that receives the communication control signal and generates a pulse signal based on the communication control signal and providing and communicatively coupling a transformer to the pulse generation circuit, wherein the transformer receives the pulse signal from the pulse generation circuit and provides the pulse signal. Providing the control isolation circuit further comprises providing and communicatively coupling a pulse decode circuit to the transformer, wherein the pulse decode circuit receives the pulse signal provided by the transformer and decodes the received pulse signal into the communication control signal received by the bus transceiver switch.

Preferably, the method further comprises providing and disposing a processor transceiver switch in the first portion and configuring the processor transceiver switch to be controlled by the communication control signal.

Preferably, the method further comprises providing a processor transceiver circuit having a processor transmit terminal and a processor receive terminal and selectively communicatively coupling the processor transceiver switch with the processor transmit terminal and the processor receive terminal.

Preferably, wherein providing the processor transceiver circuit comprises providing a processor transmit circuit and a processor receive circuit. The method also further comprises receiving with the processor transmit circuit a digital communication provided by a processor in the first portion and transmitting with the processor transmit circuit the received digital communication to the processor transceiver switch, and receiving with the processor receive circuit a digital communication from the processor transceiver switch and transmitting with the processor receive circuit the received digital communication to the processor.

Preferably, the method further comprises providing a bus transceiver circuit having a bus transmit terminal and a bus receive terminal and selectively communicatively coupling the bus transceiver switch with the bus transmit terminal and the bus receive terminal.

Preferably, the providing the bus transceiver circuit comprises providing a bus transmit circuit and a bus receive circuit. The method further comprises receiving with the bus transmit circuit a digital communication from the bus transceiver switch and transmitting the received digital communication to a bus loop, and receiving with the bus receive circuit a digital communication from the bus loop and transmitting the received digital communication to the bus transceiver switch.

BRIEF DESCRIPTION OF THE DRAWINGS

The same reference number represents the same element on all drawings. It should be understood that the drawings are not necessarily to scale.

DETAILED DESCRIPTION

FIGS. 2-6 and the following description depict specific examples to teach those skilled in the art how to make and use the best mode of embodiments of electronics including electrical isolation. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form the electronics including the electrical isolation. As a result, the embodiments described below are not limited to the specific examples described below, but only by the claims and their equivalents.

The issues associated with two separate isolation devices, such as "echoing back" and duplicative board space utilization, can be avoided by providing a bidirectional isolation circuit separating a first portion from a second portion of an electronics. A bus transceiver switch is disposed in the second portion and is communicatively coupled to the bidirectional isolation circuit. The bus transceiver switch receives from the bidirectional isolation circuit a communication control signal provided by the first portion. Accordingly, the communication control signal can control the bus transceiver switch to selectively communicatively couple a transmit circuit or a receive circuit in the second portion to the bidirectional isolation circuit. As a result, the bidirectional isolation circuit can be used for transmitting and receiving, for example, half duplex mode digital communications. Because the bidirectional isolation circuit is used for both transmitting and receiving, the issues associated with the two separate isolation devices, such as echoing back and duplicative board space utilization, are eliminated, as will be explained in more detail below.

Figure 2:
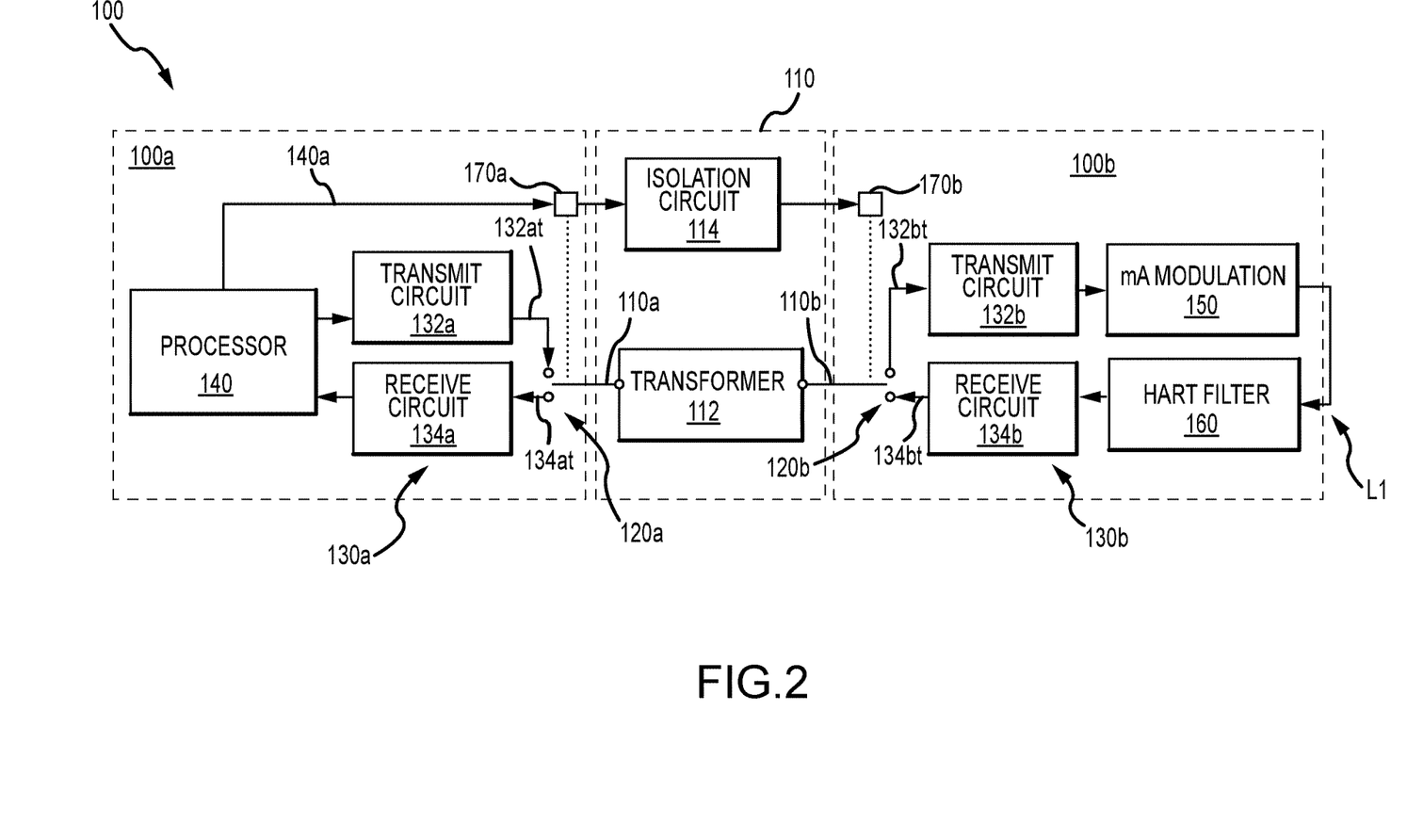
FIGS. 2 and 3 show an electronics 100, 200 including electrical isolation.
Figure 3:
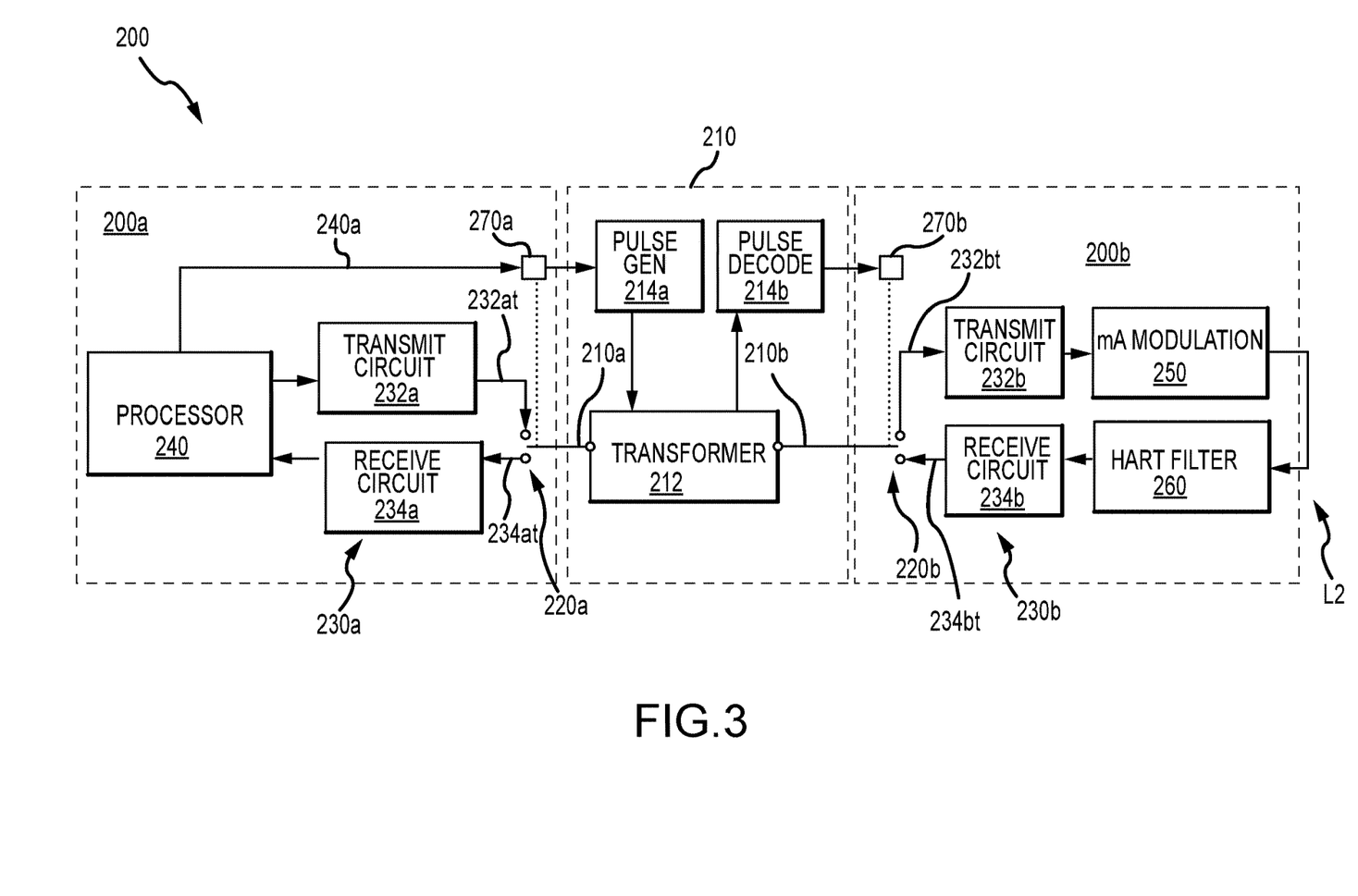

FIGS. 2 and 3 show an electronics 100, 200 including electrical isolation. As shown in FIGS. 2 and 3, the electronics 100, 200 includes a first portion 100a, 200a and a second portion 100b, 200b. The electronics 100, 200 include a bidirectional isolation circuit 110, 210 that, via a processor terminal 110a, 210a and a bus terminal 110b, 210b, is communicatively coupled to and disposed between the first portion 100a, 200a and a second portion 100b, 200b. The processor terminal 110a, 210a and the bus terminal 110b, 210b may be viewed as ports of a two-port network. The bidirectional isolation circuit 110, 210 electrically isolates the first portion 100a, 200a from the second portion 100b, 200b. For example, the first portion 100a, 200a may be electrically non-isolated and the second portion 100b, 200b may be electrically isolated. Accordingly, noise, transients, high voltages, or the like, present in the first portion 100a, 200a may not conduct or otherwise couple to the second portion 100b, 200b. As will be described in more detail in the following, the bidirectional isolation circuit 110, 210 is also configured to electrically isolate the first portion 100a, 200a from the second portion 100b, 200b using separate transmit and receive circuits through a single electrical isolation device or single isolation point. As a result, board space requirement is reduced and the echo back effect is eliminated.

Electronics

The electronics 100, 200 include a processor transceiver switch 120a, 220a and a bus transceiver switch 120b, 220b respectively disposed in the first portion 100a, 200a and the second portion 100b, 200b. The processor transceiver switch 120a, 220a and the bus transceiver switch 120b, 220b are communicatively coupled with the bidirectional isolation circuit 110, 210. The processor transceiver switch 120a, 220a and the bus transceiver switch 120b, 220b are also respectively communicatively (e.g., selectively) coupled a processor transceiver circuit 130a, 230a and a bus transceiver circuit 130b, 230b.

The processor transceiver circuit 130a, 230a includes processor transmit terminal 132at, 232at and processor receive terminal 134at, 234at. As shown in FIGS. 2 and 3, the processor transceiver switch 120a, 220a is selectively communicatively coupled with the processor transmit terminal 132at, 232at and the processor receive terminal 134at, 234at. In the second portion 100b, 200b, the bus transceiver circuit 130b, 230b includes a bus transmit terminal 132bt, 232bt and a bus receive terminal 134bt, 234bt. The bus transceiver switch 120b, 220b is selectively communicatively coupled to the bus transmit terminal 132bt, 232bt and the bus receive terminal 134bt, 234bt.

The bus transceiver circuit 130b, 230b is communicatively coupled to a mA modulation circuit 150, 250 and a HART filter 160, 260. In particular, as shown in FIGS. 2 and 3, the bus transmit circuit 132b, 232b is communicatively coupled to the mA modulation circuit 150, 250 and the bus receive circuit 134b, 234b is communicatively coupled to the HART filter 160. The mA modulation circuit 150, 250 and the HART filter 160, 260 are communicatively coupled to a bus loop L1, L2. The mA modulation circuit 150, 250 is configured to transmit a digital communication to the bus loop L1, L2 and the HART filter 160, 260 is configured to receive a digital communication from the bus loop L1, L2.

As shown in FIGS. 2 and 3, the processor transceiver switch 120a, 220a is communicatively coupled to a transformer 112, 212 in the bidirectional isolation circuit 110, 210, although any suitable isolation circuit may be employed instead of the transformer 112, 212. The transformer 112, 212 is respectively communicatively coupled to the first portion 100a, 200a and the second portion 100b, 200b via the processor terminal 110a, 210a and the bus terminal 110b, 210b. The transformer 112, 212 may be viewed as a two-port network where the processor terminal 110a, 210a and the bus terminal 110b, 210b are respectively a first port and a second port. Accordingly, the transformer 112, 212 may be a single device or a single isolation point that is configured to receive a digital communication from the first portion 100a, 200a or the second portion 100b, 200b.

The transformer 112, 212 can be selected and/or designed for a particular communication protocol. For example, as discussed above, the HART protocol utilizes a binary FSK scheme where the logic "0" is a sinusoidal signal at 2200 Hz and the logic "1" is a sinusoidal signal at 1200 Hz. Additionally, the current available for an input to the transformer 112, 212 may be limited. Accordingly, various parameters of the transformer 112, 212 can be designed/selected to ensure that the waveform of a sinusoidal signal output by the transformer 112, 212 has a substantially similar shape as a sinusoidal input to the transformer 112, 212 at both 2200 and 1200 Hz, utilizes the available current supply, and prevent noise, transients, high voltage, or the like from conducting.

As discussed above, the HART is a half-duplex communication protocol. This means that only the electronics 100, 200 or a device on the bus loop L1, L2 is transmitting at any given time. For example, a HOST sends a command and a SLAVE sends a response. As used herein, the terms "transmit" and "receive" are used from the perspective of the electronics 100, 200. HART communications is done by mA modulation (changing the current level at 1200 Hz and 2200 Hz). The electronics 100, 200 receive when waiting for a command from the HOST. The electronics 100, 200 transmit by sending a response. Whether received or transmitted, the signal is passed by mA modulation. The mA modulation may be performed by the mA modulation circuit 150, 250 and the HART filter 160, 260 can receive the command from the HOST and may remove the mA modulation.

As mentioned above, the digital communication may be provided by the first portion 100a, 200a. To provide this digital communication for a transmit, the first portion 100a, 200a includes a processor 140, 240 communicatively coupled to the processor transceiver circuit 130a, 230a. The processor 140, 240 may be any suitable processor and may include a HART modem. For example, the processor 140, 240 may be comprised of a single CPU or multiple CPUs, memory of various types, I/O ports, etc. Additionally or alternatively, a HART modem that receives and transmits a digital communication may be physically separate from and/or in communication with a processor that provides a communication control signal.

As shown in FIGS. 2 and 3, the processor 140, 240 is configured to provide a digital communication to the processor transmit circuit 132a, 232a and receive a digital communication from the processor receive circuit 134a, 234a. Also as shown in FIGS. 2 and 3, the processor 140, 240 provides a communication control signal 140a, 240a to the bidirectional isolation circuit 110, 210. The communication control signal 140a, 240a controls whether the electronics 100, 200 is transmitting or receiving. However, the bidirectional isolation circuit 110 shown in FIG. 2 utilizes the communication control signal 140a differently than the bidirectional isolation circuit 210 utilizes the communication control signal 240a shown in FIG. 3, as will be explained in more detail in the following.

Use of a Communication Control Signal

As shown in FIG. 2, the bidirectional isolation circuit 110 includes a control isolation circuit 114 in addition to the transformer 112. The control isolation circuit 114 is communicatively coupled to the first portion 100a and the second portion 100b. In particular, the control isolation circuit 114 is communicatively coupled to the processor 140 in the first portion 100a. As shown, the control isolation circuit 114 is communicatively coupled to the processor 140 via a first control signal node 170a. The control isolation circuit 114 is also communicatively coupled to the bus transceiver switch 120b. As shown, the control isolation circuit 114 is communicatively coupled to the bus transceiver switch 120b via a second control signal node 170b. The first and second control signal nodes 170a, 170b can provide the communication control signal 140a to the processor and bus transceiver switches 120a, 120b in the same or different form. The control isolation circuit 114 electrically isolates the first portion 100a from the second portion 100b by preventing electrical noise, transients, high voltages, or the like, from conducting, for example, from the first portion 100a to the second portion 100b while still allowing the communication control signal 140a to transmit from the first portion 100a to the second portion 100b.

As shown in FIG. 2, the communication control signal 140a is provided to the control isolation circuit 114 in the bidirectional isolation circuit 110. The control isolation circuit 114 receives the communication control signal 140a and provides the communication control signal 140a to the bus transceiver switch 120b to control a state of the bus transceiver switch 120b. As can be seen, the communication control signal 140a is also provided to the processor transceiver switch 120a before the communication control signal 140a is received by the control isolation circuit 114 to control the state of the processor transceiver switch 120a.

The control isolation circuit 114 may include a pulse transformer, such as, for example, a printed circuit board (PCB) pulse transformer. A pulse transformer may be desirable where the communication control signal is encoded into pulses. Such an embodiment of the control isolation circuit 114 is described with reference to FIG. 4. Referring to FIG. 2, the pulse transformer may ensure that a pulse provided by the control isolation circuit 114 has a desirable shape, such as a shape that is substantially the same as a shape of the pulse provided to the pulse transformer. For example, the pulse provided by the control isolation circuit 114 may have a rise time and a width that is substantially the same as a pulse received by the pulse transformer. Because the pulse provided by the control isolation circuit 114 is substantially the same as the pulse received by the pulse transformer, the bus transceiver switch 120b may actuate as desired.

Although the control isolation circuit 114 may include a pulse transformer, any suitable isolation circuit may be employed. For example, the control isolation circuit 114 may include a custom transformer designed for other communication control signals. Other means of isolating the first portion 100a and the second portion 100b while still allowing the communication control signal 140a to transmit to the second portion 100b may be employed. An example is discussed below with reference to FIG. 3.

As shown in FIG. 3, the bidirectional isolation circuit 210 includes a pulse generation circuit 214a communicatively coupled to the first portion 200a. In particular, the pulse generation circuit 214a is communicatively coupled to the processor 240 via a first control signal node 270a. The pulse generation circuit 214a is also communicatively coupled to the transformer 212 in the bidirectional isolation circuit 210. The bidirectional isolation circuit 210 also includes a pulse decode circuit 214b that is communicatively coupled to the transformer 212 and the second portion 200b. More specifically, the pulse decode circuit 214b is communicatively coupled to the bus transceiver switch 220b via a second control signal node 270b. The first and second control signal nodes 270a, 270b can provide the communication control signal 240a to the processor and bus transceiver switches 220a, 220b in the same or different form. The pulse generation circuit 214a and pulse decode circuit 214b are described in more detail below with reference to FIG. 4.

Referring to FIG. 3, the communication control signal 240a is provided to the pulse generation circuit 214a. The pulse generation circuit 214a receives the communication control signal 240a and provides a pulse signal to the transformer 212. The transformer 212 provides the received pulse to the pulse decode circuit 214b. The pulse decode circuit decodes the pulse signal into the communication control signal 240a that is provided to the bus transceiver switch 220b to control the bus transceiver switch 220b. As can be seen, before the communication control signal 240a is received by the pulse generation circuit 214a, the communication control signal 240a is also provided to the processor transceiver switch 220a to control the processor transceiver switch 220a.

Transmit and Receive Configuration of an Electronics

Controlling the processor transceiver switch 120a, 220a and the bus transceiver switch 120b, 220b may include switching their positions. For example, one position in the processor transceiver switch 120a, 220a may communicatively couple the processor terminal 110a, 210a of the bidirectional isolation circuit 110, 210 with the processor transmit terminal 132at, 232at. Another switch position in the processor transceiver switch 120a, 220a may communicatively couple the processor terminal 110a, 210a to the processor receive terminal 134at, 234at. In the bus transceiver switch 120b, 220b, a position may communicatively couple the bus terminal 110b, 210b to the bus transmit terminal 132bt, 232bt. Another switch position in the bus transceiver switch 120b, 220b may communicatively couple the bus terminal 110b, 210b with the bus receive terminal 134bt, 234bt. Any suitable positions may be employed.

The processor 140, 240 may communicate to the bus loop L1, L2 by controlling the switch positions of the processor transceiver switch 120a, 220a and bus transceiver switch 120b, 220b such that the processor transmit circuit 132a, 232a in the first portion 100a, 200a is communicatively coupled to the processor terminal 110a, 210a and the bus transmit circuit 132b, 232b in the second portion 100b, 200b is communicatively coupled to the bus terminal 110b, 210b. Accordingly, the processor 140, 240 can provide data to the bus loop L1, L2 via the processor transmit circuit 132a, 232a, the transformer 112, 212, and the bus transmit circuit 132b, 232b. Accordingly, the electronics 100, 200 is placed in a transmit configuration. As can be appreciated, the electronics 100, 200 may also be placed in a receive configuration.

By placing the electronics 100, 200 in the transmit configuration or a receive configuration, the transformer 112, 212 may be used for bidirectional signal transmission. Since only a single transformer 112, 212 is used as a single isolation point or a two-port network for digital communications at any given time, the echo back present in the prior art electronics 10 shown in FIG. 1 may not be present. In addition, the transformer 112, 212 may have good sinusoidal (e.g., HART) waveform integrity. For example, during a transmission of a HART bit, the transformer 112, 212 may output a sinusoidal signal having a shape that is substantially the same as the shape received by the transformer 112, 212. Additionally, the transformer 112, 212 may be also be constructed to meet hazardous approval spacing.

A Control Isolation Circuit

Figure 4:
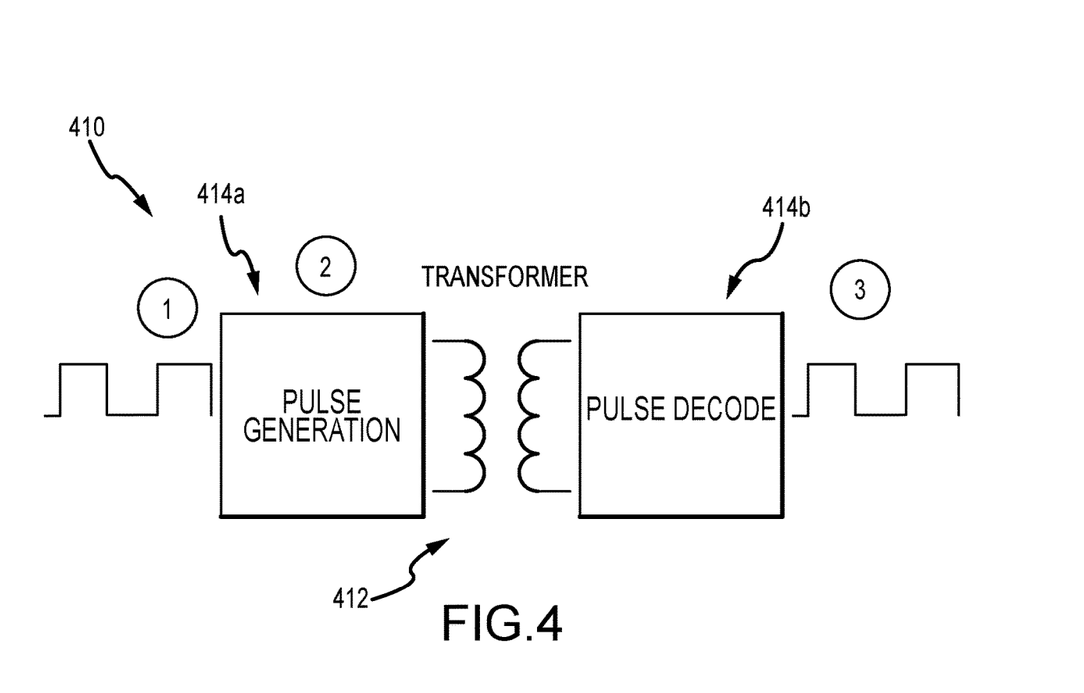
FIG. 4 shows a detailed view of a control isolation circuit 410 employing a transformer 412 for the communication control signal 140a, 240a, such as the pulse isolation transformer employed in the control isolation circuit 114 or the transformer 212 described above with reference to FIGS. 2 and 3.

FIG. 4 shows a detailed view of a control isolation circuit 410 employing a transformer 412 for the communication control signal 140a, 240a, such as the pulse isolation transformer employed in the control isolation circuit 114 or the transformer 212 described above with reference to FIGS. 2 and 3. As shown in FIG. 4, the control isolation circuit 410 includes a transformer 412 communicatively coupled to a pulse generation circuit 414a and a pulse decode circuit 414b. The pulse generation circuit 414a and the pulse decode circuit 414b may be included in the control isolation circuit 114 described above with reference to FIG. 2. The pulse generation circuit 414a and the pulse decode circuit 414b may also be the same as the pulse generation circuit 214a and the pulse decode circuit 214b described above with reference to FIG. 3.

Figure 5:
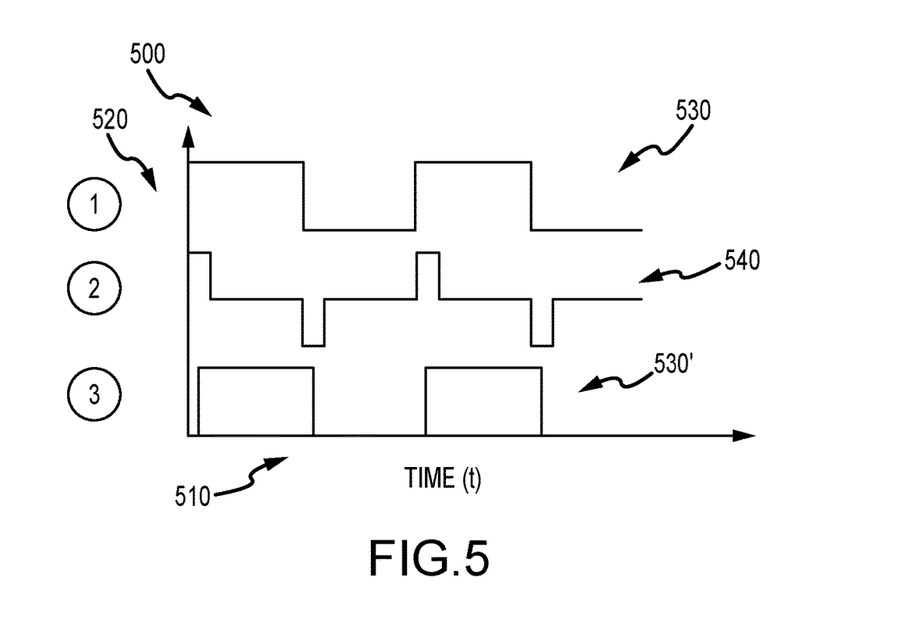
FIG. 5 shows a signal timing diagram 500 including a time axis 510 and a bit state axis 520.

FIG. 5 shows a signal timing diagram 500 including a time axis 510 and a bit state axis 520. The signal timing diagram 500 is shown as including a communication control signal 530, a pulse signal 540, and a decoded communication control signal 530'. The communication control signal 530 may be the same as the communication control signal described above with reference to FIGS. 2 and 3. The pulse signal 540 may be generated by the pulse generation circuit in the control isolation circuit 114 described with reference to FIG. 2 or the pulse generation circuit 214a shown in FIG. 3. The pulse signal 540 may also be decoded by the pulse decode circuit in the control isolation circuit 114 described with reference to FIG. 2 or the pulse decode circuit 214b shown in FIG. 3. The pulse signal 540 may be decoded into the decoded communication control signal 530'.

As shown in FIG. 4, the pulse generation circuit 414a receives the communication control signal 530 from a first portion of an electronics, such as, for example, the electronics 100, 200 described above with reference to FIGS. 2 and 3. The first portion may be the first portions 100a, 200a described above with reference to FIGS. 2 and 3. As shown in FIG. 5, the communication control signal 530 is a digital signal where, for example, a bit value of "1" may correspond to the electronics 100, 200 being configured to receive data from the loops L1, L2. That is, the processor transceiver switch 120a, 220a and the bus transceiver switch 120b, 220b communicatively couple the transformer 112, 212 to the processor receive circuit 134a, 234a and the bus receive circuit 134b, 234b and communicatively de-couple the transformer 112, 212 from the processor transmit circuit 132a, 232a and the bus transmit circuit 132b, 232b.

As can be appreciated, when the communication control signal 530 is at a bit value of "0", the electronics 100, 200 may be configured to transmit data to the bus loops L1, L2. In this configuration, the processor transmit circuits 132a, 232a and the bus transmit circuits 132b, 232b can be communicatively coupled to the transformers 112, 212 and the processor receive circuits 134a, 234a and bus receive circuits 134b, 234b may be communicatively de-coupled from the transformers 112, 212.

The communication control signal 530 control of the processor transceiver switches 120a, 220a and the bus transceiver switches 120b, 220b is illustrated by the dash lines between the communication control signals 140a, 240a and processor transceiver switches 120a, 220a and the bus transceiver switches 120b, 220b in FIGS. 2 and 3. As can be appreciated, as shown in FIGS. 2 and 3, the communication control signal 530 may also be provided to the control isolation circuit 114 and the pulse generation circuit 214a and provided by the control isolation circuit 114 and the pulse decode circuit 214b, the functions of which are described by referring to FIG. 4.

As shown in FIG. 4, the pulse generation circuit 414a receives the communication control signal 530, which is illustrated as a digital wave form, and generates the pulse signal 540. The pulses in the pulse signal 540 may be in the micro-seconds (kHz) range and therefore can be filtered from the mA current loop by a simple low-pass filter. The pulses in the pulse signal 540 are shown as being comprised of a positive going pulse and a negative going pulse. However, any suitable pulse signal may be employed.

The pulse generation circuit 414a can create the positive going pulse and the negative going pulse by switching a reference, half-way between a voltage supply, between power and ground. The duration may be controlled by a resistor-capacitor (RC) timing circuit. However, any suitable means can be employed to create the shown pulse signal 540 or any other pulse signal.

The pulse decode circuit 414b decodes the pulse signal 540 into the decoded communication control signal 530'. In one example, the pulse decode circuit 414b may be comprised of two MOSFETs that detect a positive or negative pulse and latch it with a flip-flop (Clocked D-type). A positive detection latches the "switch" in one direction and a negative pulse latches the "switch" in the other direction. In the embodiment of FIG. 3, an amplitude of the pulse signal 540 may be greater than an amplitude of a digital communications. Accordingly, the digital communications is not detected by, for example, the two MOSFETs. For example, the amplitude of the pulse signal 540 may be greater than a latching threshold of the two MOSFETs, whereas the amplitude of the digital communications may be less than the latching threshold. As a result, only the pulse signal 540 is decoded into the decoded communication control signal 530'. Accordingly, the decoded communication control signal 530' may be recreated and used to control, for example, the bus transceiver switches 120b, 220b shown in FIGS. 2 and 3. However, any suitable means may be employed to decode the pulse signal 540 into the decoded communication control signal 530'.

As discussed above, the transformer 412 shown in FIG. 4, may be a pulse transformer in the control isolation circuit 114 shown in FIG. 2 or the transformer 212 shown in FIG. 3. Both of the bidirectional isolation circuits 110, 210 shown in FIGS. 2 and 3 use pulse signals to switch between the receive configuration and the transmit configuration. The transformer 212 shown in FIG. 3, may pass the HART frequencies of 1200 Hz and 2200 Hz. Accordingly, the transformer 212 may include magnetic cores due to the relatively low frequencies. The control isolation circuit 114 shown in FIG. 2 may only pass a relatively high frequency pulse, such as the pulse signal 540 shown in FIG. 5, and may therefore be designed accordingly. The bidirectional isolation circuit 110 of FIG. 2 may be suitable for low power applications and the bidirectional isolation circuit 210 of FIG. 3 can use a common transformer for transferring both the pulse signal 540 and a digital communications. However, as can be appreciated, any suitable isolation circuit may be employed and does not necessarily require the use of pulse signals.

A Method of Electrically Isolating a Portion of an Electronics

Figure 6:
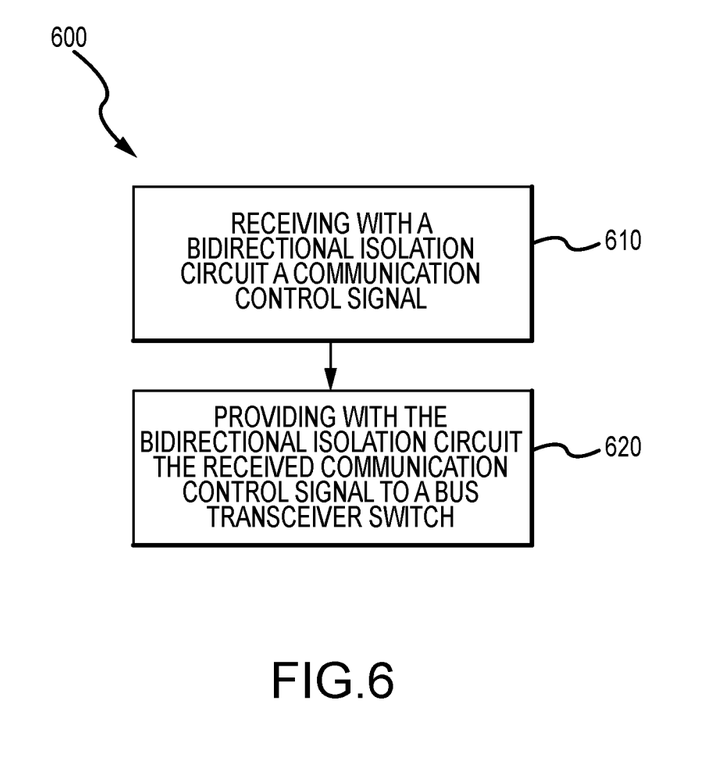
FIG. 6 shows a method 600 of electrically isolating a portion of an electronics.

FIG. 6 shows a method 600 of electrically isolating a portion of an electronics. As shown in FIG. 6, the method 600 begins by receiving with a bidirectional isolation circuit a communication control signal in step 610. The bidirectional isolation circuit may separate a first portion and a second portion of the electronics. The communication control signal is provided by the first portion. In step 620, the method 600 provides with the bidirectional isolation circuit the received communication control signal to a bus transceiver switch disposed in the second portion.

The method 600 may further include providing a transformer in the bidirectional isolation circuit. The transformer provided by the method 600 may or may not be the same as the transformers 112, 212 discussed above with reference to FIGS. 2 and 3. Where the transformer is provided in the bidirectional isolation circuit, the method 600 may further include providing and communicatively coupling a pulse generation circuit to the transformer and providing and communicatively coupling a pulse decode circuit to the transformer.

The pulse generation circuit may receive the communication control signal from the first portion, generate a pulse signal based on the communication control signal, and provides the pulse signal to the transformer. The pulse decode circuit may receive the pulse signal from the transformer and decode the received pulse signal into the communication control signal received by the bus transceiver switch. The pulse generation circuit and the pulse decode circuit employed by the method 600 may respectively be the same as the pulse generation circuit 214a, 414a and the pulse decode circuit 214b, 414b described above, although any suitable circuits may be employed.

Additionally or alternatively, the method 600 may further include providing a control isolation circuit. Where the control isolation circuit is provided, the method 600 may also include receiving with the control isolation circuit the communication control signal and providing with the control isolation circuit the received communication control signal to the bus transceiver switch disposed in the second portion. The control isolation circuit employed by method 600 may or may not be the control isolation circuit 114 described above with reference to FIG. 2, although any suitable isolation circuit may be employed.

Providing the control isolation circuit may include providing a pulse generation circuit that receives the communication control signal and generates a pulse signal based on the communication control signal and providing and communicatively coupling a transformer to the pulse generation circuit. The transformer may receive the pulse signal from the pulse generation circuit and provide the pulse signal. Providing the control isolation circuit may also include providing and communicatively coupling a pulse decode circuit to the transformer. The pulse decode circuit may receive the pulse signal provided by the transformer and decode the received pulse signal into the communication control signal received by the bus transceiver switch. The pulse generation circuit and the pulse decode circuit may be the pulse generation circuit and pulse decode circuit included in the control isolation circuit 114 described above with reference to FIG. 2, although any suitable circuits may be employed.

The method 600 may also include providing and disposing a processor transceiver switch in the first portion and configuring the processor transceiver switch to be controlled by the communication control signal. The processor transceiver switch employed by the method 600 may be the processor transceiver switches 120a, 220a described above, although any suitable switch may be employed.

The method 600 may further include providing a processor transceiver circuit having a processor transmit terminal and a processor receive terminal. The processor transceiver circuit employed by the method 600 may be the processor transceiver circuits 130a, 230a described above with reference to FIGS. 2 and 3. Where the processor transceiver circuit is provided, the method 600 may also include selectively communicatively coupling the processor transceiver switch with the processor transmit terminal and the processor receive terminal.

The step of providing the processor transceiver circuit may include providing a processor transmit circuit and a processor receive circuit. Where the processor transmit circuit and the processor receive circuit are provided, the method 600 may also include receiving with the processor transmit circuit a digital communication provided by a processor in the first portion and transmitting with the processor transmit circuit the received digital communication to the processor transceiver switch, and/or receiving with the processor receive circuit a digital communication from the processor transceiver switch and transmitting with the processor receive circuit the received digital communication to the processor.

The method 600 may further include providing a bus transceiver circuit having a bus transmit terminal and a bus receive terminal and selectively communicatively coupling the bus transceiver switch with the bus transmit terminal and the bus receive terminal. Providing the bus transceiver circuit may comprise providing a bus transmit circuit and a bus receive circuit. Where the bus transmit circuit and the bus receive circuit are provided, the method 600 may further include receiving with the bus transmit circuit a digital communication from the bus transceiver switch and transmitting the received digital communication to a bus loop, and receiving with the bus receive circuit a digital communication from the bus loop and transmitting the received digital communication to the bus transceiver switch.

The electronics 100, 200, and, in particular, the bidirectional isolation circuit 110, 210 electrically isolates the first portion 100a, 200a of the electronics 100, 200 and the second portion 100b, 200b of the electronics 100, 200 from each other. The bidirectional isolation circuit 110, 210 employs a single isolation device as a single isolation point, such as the transformers 112, 212 described above, for both receiving communications from the bus loops L1, L2 and transmitting a communication to the bus loops L1, L2. As a result, less board space is used and the echo back issue is eliminated.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other electronics including electrical isolation and not just to the embodiments described above and shown in the accompanying figures. Accordingly, the scope of the embodiments described above should be determined from the following claims.

I claim:

1. An electronics including an electrical isolation, the electronics comprising:
   a bidirectional isolation circuit separating a first portion from a second portion; and
   a bus transceiver switch disposed in the second portion, the bus transceiver switch being communicatively coupled to the bidirectional isolation circuit for bidirectional signal transmission;
   wherein the bus transceiver switch receives from the bidirectional isolation circuit a communication control signal provided by the first portion to control the bus transceiver switch.

2. The electronics of claim 1, wherein the bidirectional isolation circuit is comprised of a transformer having a processor terminal and a bus terminal.

3. The electronics of claim 2, wherein the bidirectional isolation circuit further comprises:
   a pulse generation circuit communicatively coupled to the transformer, the pulse generation circuit being configured to:
   receive the communication control signal;
   generate a pulse signal based on the communication control signal; and
   provide the pulse signal to the transformer; and
   a pulse decode circuit communicatively coupled to the transformer and configured to receive the pulse signal from the transformer and decode the received pulse signal into the communication control signal received by the bus transceiver switch.

4. The electronics of claim 1, wherein the bidirectional isolation circuit is further comprised of a control isolation circuit configured to receive the communication control signal from the first portion of the electronics and provide the communication control signal to the bus transceiver switch.

5. The electronics of claim 4, wherein the control isolation circuit is comprised of:
   a pulse generation circuit and configured to receive the communication control signal and generate a pulse signal based on the communication control signal;
   a transformer communicatively coupled to the pulse generation circuit and configured to receive the pulse signal from the pulse generation circuit and provide the pulse signal; and
   a pulse decode circuit communicatively coupled to the transformer and configured to receive the pulse signal provided by the transformer and decode the received pulse signal into the communication control signal received by the bus transceiver switch.

6. The electronics of claim 1, further comprising a processor transceiver switch disposed in the first portion of the electronics, the processor transceiver switch being configured to be controlled by the communication control signal.

7. The electronics of claim 6, further comprising a processor transceiver circuit having a processor transmit terminal and a processor receive terminal, wherein the processor transceiver switch is selectively communicatively coupled with the processor transmit terminal and the processor receive terminal.

8. The electronics of claim 7, wherein the processor transceiver circuit is comprised of a processor transmit circuit and a processor receive circuit, wherein:
the processor transmit circuit is configured to receive a digital communication from a processor in the first portion and transmit the received digital communication to the processor transceiver switch; and
the processor receive circuit is configured to receive a digital communication from the processor transceiver switch and transmit the received digital communication to the processor.

9. The electronics of claim 1, further comprising a bus transceiver circuit having a bus transmit terminal and a bus receive terminal, wherein the bus transceiver switch is selectively communicatively coupled with the bus transmit terminal and the bus receive terminal.

10. The electronics of claim 9, wherein the bus transceiver circuit is comprised of a bus transmit circuit and a bus receive circuit, wherein:
the bus transmit circuit is configured to receive a digital communication from the bus transceiver switch and transmit the received digital communication to a bus loop; and
the bus receive circuit is configured to receive a digital communication from the bus loop and transmit the received digital communication to the bus transceiver switch.

11. A method of electrically isolating a portion of an electronics, the method comprising:
receiving with a bidirectional isolation circuit a communication control signal, wherein:
the bidirectional isolation circuit separates a first portion and a second portion of the electronics; and
the communication control signal is provided by the first portion; and
providing with the bidirectional isolation circuit the received communication control signal to a bus transceiver switch disposed in the second portion to control the bus transceiver switch for bidirectional signal transmission.

12. The method of claim 11, further comprising providing a transformer in the bidirectional isolation circuit, the transformer having a processor terminal and a second terminal.

13. The method of claim 12, further comprising:
providing and communicatively coupling a pulse generation circuit to the transformer, wherein the pulse generation circuit:
receives the communication control signal from the first portion;
generates a pulse signal based on the communication control signal; and
provides the pulse signal to the transformer; and
providing and communicatively coupling a pulse decode circuit to the transformer, wherein the pulse decode circuit receives the pulse signal from the transformer and decodes the received pulse signal into the communication control signal received by the bus transceiver switch.

14. The method of claim 11, further comprising:
providing a control isolation circuit;
receiving with the control isolation circuit the communication control signal; and
providing with the control isolation circuit the received communication control signal to the bus transceiver switch disposed in the second portion.

15. The method of claim 14, wherein providing the control isolation circuit comprises:
providing a pulse generation circuit that receives the communication control signal and generates a pulse signal based on the communication control signal;
providing and communicatively coupling a transformer to the pulse generation circuit, wherein the transformer receives the pulse signal from the pulse generation circuit and provides the pulse signal; and
providing and communicatively coupling a pulse decode circuit to the transformer, wherein the pulse decode circuit receives the pulse signal provided by the transformer and decodes the received pulse signal into the communication control signal received by the bus transceiver switch.

16. The method of claim 11, further comprising providing and disposing a processor transceiver switch in the first portion and configuring the processor transceiver switch to be controlled by the communication control signal.

17. The method of claim 16, further comprising providing a processor transceiver circuit having a processor transmit terminal and a processor receive terminal and selectively communicatively coupling the processor transceiver switch with the processor transmit terminal and the processor receive terminal.

18. The method of claim 17, wherein providing the processor transceiver circuit comprises providing a processor transmit circuit and a processor receive circuit and the method further comprising:
receiving with the processor transmit circuit a digital communication provided by a processor in the first portion and transmitting with the processor transmit circuit the received digital communication to the processor transceiver switch; and
receiving with the processor receive circuit a digital communication from the processor transceiver switch and transmitting with the processor receive circuit the received digital communication to the processor.

19. The method of claim 11, further comprising providing a bus transceiver circuit having a bus transmit terminal and a bus receive terminal and selectively communicatively coupling the bus transceiver switch with the bus transmit terminal and the bus receive terminal.

20. The method of claim 19, wherein the providing the bus transceiver circuit comprises providing a bus transmit circuit and a bus receive circuit and further comprising:
receiving with the bus transmit circuit a digital communication from the bus transceiver switch and transmitting the received digital communication to a bus loop; and
receiving with the bus receive circuit a digital communication from the bus loop and transmitting the received digital communication to the bus transceiver switch.

* * * * *

UNITED STATES PATENT AND TRADEMARK OFFICE
CERTIFICATE OF CORRECTION

| | | Page 1 of 1 |
|---|---|---|
| PATENT NO. | : 11,881,888 B2 | |
| APPLICATION NO. | : 16/977537 | |
| DATED | : January 23, 2024 | |
| INVENTOR(S) | : Brian T. Smith | |

It is certified that error appears in the above-identified patent and that said Letters Patent is hereby corrected as shown below:

On the Title Page

Column 2, under item (57), Abstract, Line 4, replace "a second portion (100, 200b)" with --a second portion (100b, 200b)--

Signed and Sealed this
Twenty-eighth Day of January, 2025

Coke Morgan Stewart
*Acting Director of the United States Patent and Trademark Office*